G. W. COMBS.
GYRATORY STRUCTURE.
APPLICATION FILED SEPT. 28, 1908.
1,071,707.
Patented Sept. 2, 1913.
2 SHEETS—SHEET 2.
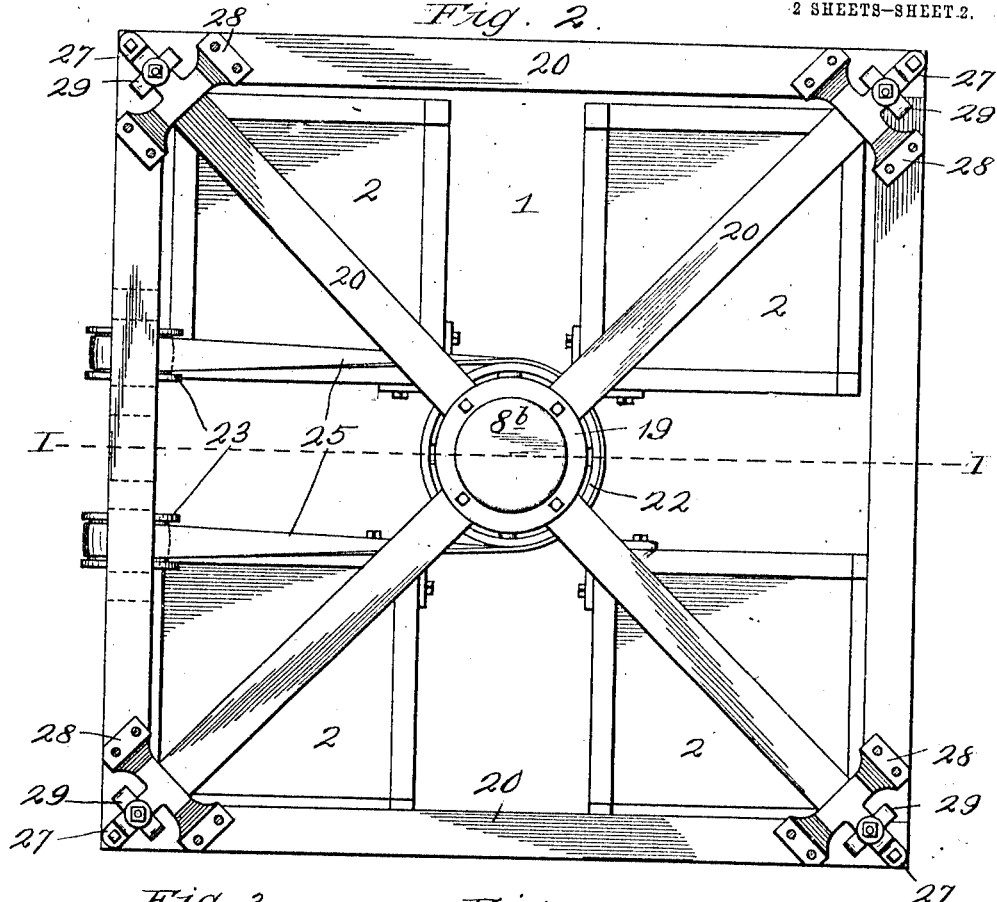
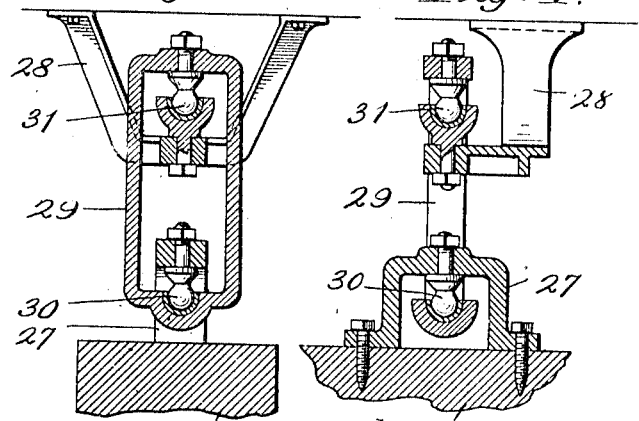
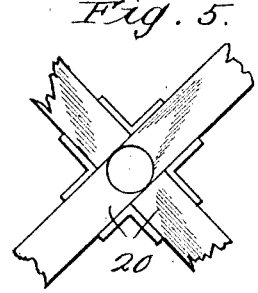
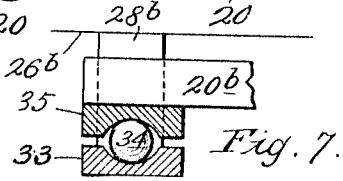
WITNESSES:
R. Hamilton
M. Cox
INVENTOR:
George W. Combs,
BY F. G. Fischer,
ATTORNEY.

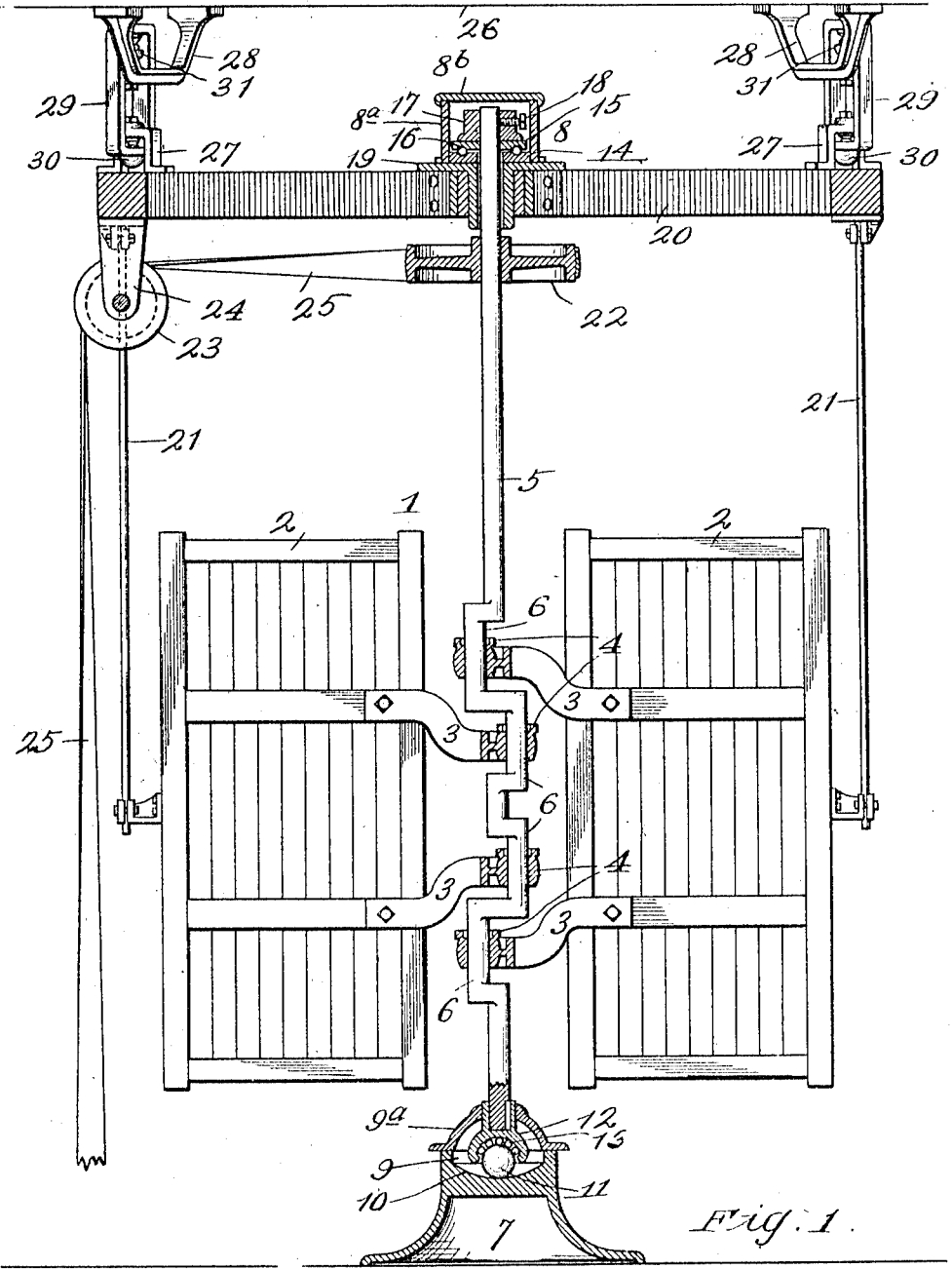

UNITED STATES PATENT OFFICE.

GEORGE W. COMBS, OF LEAVENWORTH, KANSAS.

GYRATORY STRUCTURE.

1,071,707. Specification of Letters Patent. Patented Sept. 2, 1913.

Application filed September 28, 1908. Serial No. 455,084.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

My invention relates to improvements in gyratory structure such as flour-sifters, &c.; and my object is to overcome excessive throw of the structure so as to relieve it and the building containing the same of undue strain. I attain this object by suspending the gyratory structure and the greater portion of its driving mechanism from a freely-supported overhead frame, suspended, preferably from the ceiling of the building.

Referring now to the accompanying drawings, which illustrate the invention: Figure 1 represents a vertical central section of the invention on line I—I of Fig. 2. Fig. 2 represents a plan view of the invention. Figs. 3 and 4 are vertical sections of the yielding means for supporting the overhead frame. Fig. 5 is a broken plan view of the central portion of the overhead frame. Figs. 6 and 7 show modified forms of the yielding means for supporting the overhead frame.

1 designates the gyratory structure, which in the present instance, consists of four sieve-boxes 2, although of course, I do not confine myself to any particular type of structure. The sieve-boxes are connected in diagonal pairs by bridge-trees 3, having centrally-disposed bearings 4, in which a vertically-positioned drive-shaft 5 is mounted, said shaft, in the present instance, being provided with cranks 6, which are journaled in bearings 4, for imparting a gyratory motion to the structure. Shaft 5 may be supported at one or both ends, or in other words, when it is supported at its upper end the lower support may be dispensed with, and vice versa. In the present instance I have shown a pedestal 7 at the lower end of the shaft, and a ball-bearing 8 at the upper end of said shaft for supporting the same. Pedestal 7 is secured to a stationary object, such as the floor of the building, and has a lubricant chamber 9 at its upper end, provided with a concaved bottom 10, upon which an antifriction ball 11 operates.
Said ball is mounted in a bearing 12, secured to the lower terminal of the drive-shaft and provided with small balls 13, which operate on ball 11 and further reduce the friction attendant on the operation thereof. Dust is excluded from chamber 9 by a cap 9ª. Ball-bearing 8, at the upper end of the shaft, consists of a bottom plate 14, a plate 15 arranged above the same, antifriction balls 16 interposed between said plates, and a collar 17 resting upon plate 16 and secured to the upper terminal of shaft 5 by a set-screw 18. Plate 14 rests upon a thimble 19 embracing the upper portion of the drive-shaft and secured to the central portion of the overhead frame or member 20. Dust is excluded from ball-bearing 8 by the surrounding wall 8ª, and a cap 8ᵇ resting upon said wall so that access may be had to the bearing when desired.
Although ball bearing 8 and thimble 19 permit shaft 5 to rotate freely, they do not allow independent lateral movement thereof and consequently a restraining influence against abnormal gyration of the structure 1 will be exerted by the overhead frame 20, by its connection with the structure, and through the intermediacy of shaft 5. Frame 20 supports the gyratory structure, through the intermediacy of a plurality of rods 21.
It also supports a portion of the driving mechanism for the structure, consisting of a driver 22 fixed to shaft 5, idlers 23 mounted in brackets 24 depending from the frame 20, a drive-pulley (not shown), and an endless belt 25 operating around said pulley, the idlers 23, and driver 22.

The overhead frame 20 is, preferably, of skeleton form, and is supported from the ceiling 26 of the building by means of yokes 27 secured to said frame, hangers 28 secured to ceiling 26, and links 29 yieldingly secured to the yokes and the hangers by ball-and-socket joints 30 31, respectively.

Should the structure leave its true gyratory course while in operation, it will by reason of its connection with frame 20, through the intermediacy of shaft 5, or rods 21, carry said frame 20 therewith. This will throw links 29 at an angle so that they, through the weight of the parts carried thereby, will tend to restrain abnormal throw of the structure and restore the same to its true gyratory course, the restraining influence of the links increasing in proportion to the inclination which they assume.

In the modified form, Fig. 6, 20ª designates the overhead frame which is supported from the ceiling 26ª by means of yokes 27ª secured to said overhead frame, hangers 28ª secured to the ceiling, and links 29ª yieldingly secured to the yokes and the hangers by ball-and-socket joints 30ª 31ª, respectively. Yokes 27ª are provided with cups 32 to contain oil for lubricating the joints 30ª 31ª.

In the modified form shown by Fig. 7, 20ᵇ designates the overhead frame which is supported from the ceiling 26ᵇ by hangers 28ᵇ, provided with cups 33 containing balls 34 upon which inverted cups 35, secured to the overhead frame, operate.

Having thus described my invention, what I claim is:—

1. In combination, an overhead member freely suspended for gyration, a gyratory structure suspended from said member, and a driver for said structure.

2. In combination, an overhead member gyratably-supported, a gyratory structure suspended from said member, and a vertically-positioned shaft for said structure journaled in the overhead member.

3. In combination, an overhead member freely-supported for gyration, a gyratory structure suspended from said overhead member, a centrally-disposed shaft journaled in the overhead member, and said gyratory structure, and a driver fixed to said shaft.

4. In combination, an overhead member freely supported, a gyratory sifter suspended from said member, a shaft arranged in the overhead member and said sifter and provided with cranks for imparting a gyratory movement to said sifter, and flexible power transmission devices for driving said shaft.

5. In combination, an overhead member freely-supported for gyration, a gyratory structure suspended from said member, and a shaft for the structure suspended from said overhead member.

6. In combination, an overhead member freely-supported for gyration, a gyratory structure suspended from said member, a shaft for the structure, a ball-bearing carried by the overhead member and through which the upper end of the shaft extends, and means secured to the shaft and resting upon said ball-bearing.

7. In combination, an overhead member freely-supported for gyration, a gyratory structure suspended from said member, a shaft for the structure, a ball-bearing carried by the overhead member and through which the upper end of the shaft extends, means secured to the shaft and resting upon said ball-bearing, and means for excluding dust from said ball-bearing.

8. In combination, an overhead member freely-supported for gyration, a gyratory sifter supported by said overhead member, a shaft for the sifter, a pulley fixed to said shaft, an endless belt for driving said pulley, and idlers carried by the overhead member over which said belt operates.

9. In combination, an overhead member freely-supported for gyration, a gyratory structure supported by said member, a shaft for imparting a gyratory motion to said structure, and a pedestal for supporting said shaft.

10. In combination, an overhead frame, links yieldingly-supporting said frame, and a gyratory structure suspended from said frame.

11. In combination, an overhead frame, yokes secured thereto, hangers fixed above said yokes, means loosely connecting the yokes to said hangers, and a gyratory structure suspended from the overhead frame.

12. In combination, an overhead member, yokes secured thereto, hangers fixed above said yokes, links having universal connections with the yokes and said hangers, and a gyratory sifter connected to the overhead member.

13. In combination, a rectangular overhead member, means engaging the corners thereof for freely-supporting the same for gyration, and a gyratory sifter connected to said overhead member.

In testimony whereof I affix my signature, in the presence of two witnesses.

GEORGE W. COMBS.

Witnesses:
R. E. HAMILTON,
M. COX.